Patented June 14, 1927.

UNITED STATES PATENT OFFICE.

1,632,759

ERNEST HOPKINSON, OF NEW YORK, AND WILLIS A. GIBBONS, OF LITTLE NECK, NEW YORK; SAID GIBBONS ASSIGNOR TO THE NAUGATUCK CHEMICAL COMPANY, OF NAUGATUCK, CONNECTICUT, A CORPORATION OF CONNECTICUT.

PROCESS FOR TREATING RUBBER LATEX.

No Drawing.     Application filed June 9, 1925. Serial No. 36,041.

The present invention relates to methods for removing non-rubber constituents from latex without experiencing coagulation. It is not to be supposed that these non-rubber constituents are impurities, for they do add certain desirable properties to the finished rubber. But for some uses, and particularly those uses which require a transparent rubber, it seems more desirable to eliminate certain of the non-rubber materials prior to the employment of the latex. The present invention offers a means of removing these non-rubbers without coagulation. The separation of non-rubber constituents where so desired may be facilitated by treating the latex to increase the ease with which the aqueous portion thereof will pass between the rubber particles or aggregates. The present invention offers methods for accomplishing this increase in the rate of filterability, as a direct result of which the rate of deposit of the rubber particles upon a filtering medium is greatly increased.

Previous methods for removing non-rubber constituents from Hevea latex have been focused about methods which involve coagulation of the latex and subsequent washing of the coagulated rubber upon suitable mills. During the coagulation step, where a solid mass of rubber separates from and floats upon a clear serum, the latter is found to contain a considerable proportion of the water soluble non-rubber materials. However, the coagulum itself entraps a substantial percentage of water soluble non-rubbers, and persists in holding a portion of these in spite of repeated washing with water upon the usual types of washing mills. The reason for this is that during the milling, the rubber has a tendency to lock in some of the water solubles and thus prevent them from being washed out. A further disadvantage is that in order to eliminate most of the non-rubber ingredients, it is unavoidable that the rubber is severely worked upon the mills, thus reducing its strength. It has hitherto been impossible to remove non-rubber constituents from latex without causing coagulation and thus making it impossible to employ the latex as such.

The principal object of the invention is to remove non-rubber constituents, particularly the water-soluble constituents, from uncoagulated latex. Another object of the invention is to provide means for repeatedly washing the rubber contained in latex without causing coagulation. Still another object of the invention is to provide a method for filtering the rubber-containing portion of latex from the serum. Still another object is to produce an uncoagulated rubber dispersion substantially free from water-soluble non-rubber materials. The invention also includes among its objects methods for changing the physical state of the rubber particles of the latex. It also aims to increase the speed of deposition of rubber particles on a pervious surface.

With a preferred embodiment in mind but without desiring to place undue limitation upon the scope of the invention beyond what may be required by the prior art, the invention briefly stated consists in separating the rubber containing portion of latex from the bulk of the non-rubber portion and repeatedly washing additional soluble non-rubber material from the rubber portion and recovering an uncoagulated rubber dispersion freed of the majority of its non-rubber constituents. The invention also consists in filtering Hevea latex, and especially ammonia-preserved Hevea latex, to remove the serum and water soluble non-rubber constituents from the latex without coagulation of the rubber on the latex. The invention includes previously treating the latex to increase the rate of deposition of the rubber particles on a filtering medium.

The present invention sets forth methods for filtering latex and for repeatedly washing the uncoagulated rubber particles free from residual non-rubber constituents present either as mechanically entrapped material or as material adsorbed on to the rubber particles themselves. It also sets forth methods for increasing the rate of deposition of the rubber particles of latex on a filtering medium, or in other words, methods for increasing the filterability of the latex. By selecting a proper filtering medium, such treated rubber latex may be filtered so that the material remaining upon the filter consists almost entirely of the rubber globules, together with a small amount of adsorbed non-rubbers, and the filtrate is a clear serum free from rubber. By treating the material on the filter with suitable preservatives, the rubber particles can be maintained in an uncoagulated state, and can be treated with fresh quantities of water or other washing fluid, and the process of filtration repeated until substantially all of the water solubles have been eliminated. The rubber thus freed from water soluble non-rubbers may be employed in any desired manner, for dipping, spreading, coating, or it may be used as a source of dry rubber for special adaptation.

This increased filterability may be accomplished in several different ways. The state of aggregation of the rubber globules may be increased by the addition of salts or weakly acid substances which increase the hydrogen ion concentration of the latex to such an extent that a separation of the rubber portion into a supernatant uncoagulated layer occurs. Certain of the organic colloids or protective agents, notably Irish moss, gum tragacanth, salep root, gum arabic, and others of the same general type may be employed to increase the filterability of latex. With fresh latex, and with some compounded latex, or vulcanized latex, the alkaline earth hydroxides exert a similar effect of increasing the filterability. Clays and other similar hydrophilic minerals may be employed to advantage. The same may be accomplished by the use of pectin bodies.

The increase in filterability is believed due largely to an increase in the individual spaces between the rubber particles or aggregates in the latex, although other factors may be involved, this change permitting the water to more readily pass through the deposit of rubber constituents and into the permeable filtering medium used. The increase in filterability may be readily and accurately measured by the thickness of deposit of the rubber from a treated latex onto a porous form or plate in a given time. Various filters may be employed provided they are impervious to the rubber particles in the latex. Certain weaves of fabric are particularly adaptable, notable among which is that known as single texture fire hose.

As specific illustrations, the following may be given: Latex, containing 30–35% solids is treated with a solution of calcium polysulphide, to give 0.34 parts by weight of solid calcium polysulphide per 100 parts by weight of latex. If a porous form be dipped in this treated latex for 5 minutes, and then allowed to dry, the actual weight of rubber deposited will be approximately twice as much as the deposit formed in the same time without calcium polysulphide. The salts of other bivalent metals such as zinc and of trivalent metals such as aluminum may also be used.

If desired the latex may be mixed with compounding ingredients with or without vulcanizing combinations, and the latex may or may not be vulcanized prior to the washing treatment. As an example of a vulcanized latex, the following may be employed:

| | Parts. |
|---|---|
| Preserved latex containing 35% of rubber | 100 |
| Zinc oxide XX brand | 2 |
| Precipitated sulphur | 2 |
| Oxy normal butyl thiocarbonic acid disulphide (from an emulsion) | 1 |
| Dibenzylamine (from an emulsion) | ½ |
| Glue (from an emulsion) also added separately | 2½ |
| Solvent naphtha (from an emulsion) | 3 |

This latex will vulcanize upon standing one or two weeks, and the vulcanized latex may be placed in a container in which is fitted a filtering medium such as the single ply fire hose fabric mentioned above. The filtration may be accelerated by the use of a stirrer set at a slight distance from the filtering disc. The serum runs clear after a minute or two and the rubber remains in the container. Additional water may be added and the process carried out as a continuous or discontinuous filtration until the filtrate shows substantially no water soluble material. With the above vulcanized latex, filtered under 20 lbs. pressure, the serum or filtrate comes through at two different rates, the faster rate being observed until the rubber on the upper side of the filtering disc comes in contact with the stirring apparatus. After this takes place, the rate of filtration remains approximately constant. With a stirrer set at .019 inches from the filtering disc, the above vulcanized latex filtered at the rate of 12.24 gallons per square foot of filtering surface per 24 hrs., this rate being the constant rate obtained after the rubber on the filtering disc had accumulated to a thickness of .019 inches, that is until it had reached the stirrer.

Instead of employing what may be styled a gravity filtration, or a filtration under direct pressure, a centrifugal filtration may be employed. In this instance the so-called basket centrifuge may be employed to good advantage. By making the basket lining of porous material such as earthenware, or similar material, the process may be advantageously carried out. A suitable fabric basket lining may also be utilized, as for example a lining made of fabric similar to single ply fire hose fabric. In the case of centrifugal filtration, the filtration necessarily proceeds under some pressure, the pressure of course varying with the speed of the centrifuge. In general the pressure may be increased in the centrifuge as in the previous example, the upper limit being dependent upon the filtering medium, the exact limitation being the point where the rubber particles themselves begin to force through the filter. With centrifugal filtration, additional water together with preservative materials as required may be introduced to repeat the washing process.

The example of vulcanized latex given above will desposit a film .042 inches thick in 5 minutes, as compared with .003 for ordinary preserved latex in the same length of time.

A mixture of 150 cc. of approximately 35% latex and 8.5 grams of a 3.4% Irish moss gel will give a film approximately .010 inches thick in 5 minutes, immediately after preparation. After standing over night the same mixture will give in the same length of time a deposit of .020 inches.

Certain compounding ingredients exert a similar effect upon the filterability. It appears that the rubber and filler are deposited upon a porous form in approximately the same proportions in which they are found in the mixture. A mixture containing 100 parts by weight of rubber as latex, 100 of gilders whiting, 50 of water will give a dry film .009 inches thick after a 5 minute dip. A mixture of 100 parts by weight of rubber as latex, 100 gilders whiting, 50 mineral flour and 100 water will give a dry film .014 inches thick after a 5 minute dip. A composition containing 100 of rubber as latex, 100 gilders whiting, 100 mineral flour and 150 water, will give a dry film .020 inches thick after a 5 minute dip. From these three examples it can readily be seen that the mineral flour has acted to increase the filterability of the compositions, as evidenced by the increased speed of deposit upon the porous form.

To illustrate increasing filterability by increasing the hydrogen ion concentration, an acid buffer solution composed of hydrated primary and secondary sodium phosphates may be used, or a suitable quantity of a strong base such as sodium hydroxide may be utilized. With a mixture of primary and secondary hydrated sodium phosphate as an acid buffer solution, the following results are obtained with increasing hydrogen ion concentration:

| pH. | Thickness of dry film after 5 minute dip. |
|---|---|
| 6.8 | .004 inches. |
| 6.6 | .004 inches. |
| 6.4 | .008 inches. |
| 5.5 | .025 inches. |

The figures in column one represent the negative logarithm of the concentration of hydrogen ions per litre. With no other factors present to influence the hydrogen ion concentration it would appear that the limits of pH value for the most efficient filterability would be 6.5 to 5.5. The same principle may be applied to vulcanized latex, semi-vulcanized latex, or unvulcanized latex containing vulcanizing ingredients.

In all of the instances where the filterability is increased, coagulation of the rubber particles during the washing does not take place.

If desired the latex may be put through a preliminary separating operation by treatment with suitable organic colloids or with proper buffer solutions such as those described above, whereupon the rubber portion separates in a supernatant uncoagulated layer. The serum may be simply drained off and the rubber layer then washed upon a filter as described above.

Any of the compositions set forth above will be found to filter efficiently according to the process of this invention. The filtration may be accelerated by the use of an electric current, charging the rubber particles so that they are drawn away from the filtering medium, this method of accelerating filtration being suitable for use together with the methods outlined in the above example. Vacuum filtration may be employed by making suitable changes in the apparatus. The invention is not limited to any specific filtering medium or to any particular filter, but contemplates the use of any filtering apparatus which can be adapted to carry the filtering medium which is impervious to the rubber particles in the latex but permits the passage of the aqueous portion thereof, and it is understood that the filtering apparatus must be such that it permits of the introduction of fresh quantities of water or other desired washing fluid at any time during the filtration process. The operation may be continuous or discontinuous.

By a repetition of the filtration and washing, substantially all the water soluble ingredients are removed. For some purposes it is desirable to remove not only the water soluble non-rubbers, but also the water insoluble materials normally present in rubber latex. Considering first the insoluble nitrogenous matter, this may be removed by first digesting with a proteolytic enzyme such as papain or trypsin and then washing with fresh water according to any of the above methods. The resins are not affected, except to a very small degree by the above washing process. The resins may be removed if desired by an extraction process which may be carried out upon the recovered washed rubber particles. Under proper conditions the resins may be washed from the uncoagulated latex, but it will be found more advantageous to reduce the uncoagulated nitrogen-free rubber to a finely divided dry product such as that obtained by spraying latex. This finely divided spongy product lends itself readily to extraction with a resin solvent as for example acetone.

The product obtained from all of the above treatment is in an uncoagulated state and contains practically no water-soluble non-rubber constituents and at the same time has all the strength of an unmilled rubber, in much the same form as it occurred in the original latex. The product when dried, is practically transparent, that is in cases where no compounding ingredients have been added prior to the washing. The washed rubber particles, dispersed in water, may be employed for any dipping, spreading, or coating operation, or the dispersion may be compounded after the washing treatment to give a compound latex, a vulcanized latex, or a vulcanizable latex composition which may be employed in substantially the same manner as a similar latex composition made with unwashed latex.

In addition to the uses to which this protein-free rubber may be put, the product may also be used as the chemical raw material for a large number of chemical reactions which have hitherto been impossible on account of the disturbing effect of the non-rubbers upon the proper course of chemical reactions of substitution and addition in the rubber molecule.

Having thus described our invention, what we claim and desire to protect by Letters Patent is:

1. Method of rapidly separating the aqueous portion from a rubber latex which comprises treating the latex to increase its filterability, disposing the treated latex in contact with a water permeable material and withdrawing said aqueous portion from the latex through said material.

2. Process for treating latex which consists in filtering and washing the latex while maintaining it in an uncoagulated state, and recovering a water dispersible residue containing a subnormal percentage of non-rubber constituents.

3. Process for treating latex which consists in filtering the rubber particles away from the aqueous portion of said latex, and repeatedly washing said rubber particles to remove non-rubber constituents while maintaining the rubber particles in an uncoagulated state, and recovering a water dispersible rubber freed of the majority of the non-rubber constituents.

4. Process for treating latex which consists in passing the aqueous portion of the latex through a medium adapted to restrain the rubber particles of said latex, maintaining said rubber particles in an uncoagulated state, repeatedly supplying additional washing liquid to said particles to remove further quantities of non-rubber constituents, and recovering an uncoagulated suspension of rubber particles deficient in non-rubber constituents.

5. Process for treating latex which consist in treating the latex to facilitate the passage of the aqueous portion thereof through a medium adapted to restrain the rubber particles of said latex, placing said latex in contact with said medium, maintaining said rubber particles in an uncoagulated state, and recovering a water dispersible rubber containing a sub-normal amount of non-rubber materials.

6. Process for treating latex which consists in treating the latex to facilitate the passage of the aqueous portion thereof through a medium adapted to restrain the rubber particles of said latex, placing said latex in contact with said medium maintaining said rubber particles in an uncoagulated state, repeatedly treating said rubber particles with water, and recovering an uncoagulated suspension of rubber particles freed of water soluble non-rubber constituents.

7. Process for treating latex which consists in treating the latex to facilitate the passage of the aqueous portion thereof through a medium adapted to restrain the rubber particles of said latex, placing said latex in contact with said medium maintaining said rubber particles in an uncoagulated state, repeatedly treating said rubber particles with materials adapted to facilitate the separation of the non-rubber constituents contained therein, and recovering an uncoagulated suspension of rubber particles freed of water soluble non-rubber constituents.

8. Method of rapidly separating the aqueous portion from a rubber latex which comprises treating the latex to increase the effective cross-sectional area of the water permeable voids between the rubber constituent when deposited, disposing the treated latex in contact with a water permeable material, and withdrawing said aqueous portion from the latex through said material.

9. Process for treating latex which comprises adding to the latex a salt of a bivalent metal to increase the filterability of the latex, and disposing it in contact with a permeable material.

Signed at New York, New York, this 20th day of May, 1925.
ERNEST HOPKINSON.
Signed at New York, New York, this 20th day of May, 1925.
WILLIS A. GIBBONS.